UNITED STATES PATENT OFFICE.

JOSEPH WEISMAN, OF PHILADELPHIA, PENNSYLVANIA.

IMPROVEMENT IN USING GRAPHITE IN REDUCING METALS.

Specification forming part of Letters Patent No. 19,668, dated March 16, 1858.

*To all whom it may concern:*

Be it known that I, JOSEPH WEISMAN, of Philadelphia, Pennsylvania, have discovered a new mode of using graphite, plumbago, or black-lead for the purpose of smelting or reducing metallic ores—namely, gold, silver, copper, tin, iron (black-band especially) cinnabar, nickel, and all metallic ores combined with quartz or sulphur—or separating the metals from the rock or other substances with which they may be combined, either mechanically or chemically, of which the following is a specification.

The processes by which I separate metals from the substances with which they may be combined are—

First. By the use of a crucible—thus: I fill the crucible with the ore or metals to be operated on, mixed, and embedded in powdered graphite. This being done, I lute it over as secure as possible with graphite-paste or clay, so as to exclude as much as possible the atmosphere. The crucible is then subjected to heat of a greater or less intensity, according to the nature of the materials it contains, for a period of from six to twenty-four hours. Thus, in the case of the sulphurites, twenty-four hours for the stronger and six or more for the weaker, is generally sufficient, the heat being steady and regular.

Second. By the use of slabs of graphite, either sawed out of the solid material or manufactured out of the powdered, hollowed out and made to fit each other like bullet-molds. The cavity of one of the slabs being filled with the ore or metals, the other is then laid on, and the two are fastened and luted together as tight as possible, and subjected to heat the same as the crucible. The slabs have one or more cavities, according to size.

Third. By the use of a reverberatory or other furnace. The ores or metals are in this case covered up and embedded in graphite and luted over with graphite-paste, and the heat, which should be entirely under the control of the operator, is then applied, the degree and duration of the heat to be the same as when a crucible or slabs are used, but steady and uniform. I place the ore to be operated on in the furnace mixed with powdered graphite or dip the lumps of ore into graphite and water, so that the graphite will adhere to them, before placing them in the furnace. When a sufficient quantity of ore thus mixed with or dipped in graphite and water is placed in the furnace, I cover or lute the whole over with powdered graphite, which is then formed into a paste by moistening or wetting it with water.

Fourth. Instead of using a crucible, slabs, or furnace, I operate upon the ore in the following manner, to wit: I make a stack of it, laying a layer of ore, then a layer of graphite, sometimes, also, a layer of fuel, alternating the ore and graphite so that the former shall be covered and embedded in the latter, leaving chambers or passages in the stack, so that the heat when applied may permeate the whole stack, which is to be coated all over with graphite-paste. The fuel being then placed beneath the stack, and sometimes mingled with the ore and graphite in the body of the stack, is then lighted and all the apertures closed up. The duration of the heat must depend upon the size of the stack. To one containing twenty or thirty tons of ore the heat should be applied from twenty to sixty hours. Instead of a stack, however, a stone or brick kiln, like one used for burning lime, may be used.

Fifth. For assaying, purifying, or separating the native alloys of gold or silver from other substances with which they may be combined—as sulphur, copper, iron, &c.—I use a box of sufficient size to suit the amount of metal to be assayed or smelted made of graphite. In this I place the native alloys of gold or silver, and then cover it with a slab of graphite, which is fastened down tight. This box may be placed in another made of iron, steel, soapstone, fire-brick, or anything that will stand a high heat; or it may be placed in a furnace or any suitable place where an intense, steady, well-regulated heat can be applied to it for a sufficient time to accomplish the purpose.

Sixth. Any form of vessel, furnace, stack, or crucible may be used to which a strong, regulated, steady heat may be applied, and in which the ores or metals to be operated on, separated, purified, smelted, or assayed may be embedded in or inclosed all around with graphite; but for assaying or purifying gold or silver the vessel used should be made tight and of graphite, or lined with graphite from half an inch to an inch and a half in thickness, so as to prevent the escape and waste of the metal in vapor or fine globules—so great in the present mode of managing them.

What I claim as my discovery or invention, and desire to secure by Letters Patent, is—

The use and mode of using graphite, plumbago, or black-lead, for the purposes and in the manner herein set forth and described.

Washington, July 15, 1857.

JOSEPH WEISMAN.

Attest:
N. SARGENT,
JOHN S. HOLLINGSHEAD.